Dec. 7, 1965  R. W. HOUSER  3,221,991
PNEUMATIC THERMOSTAT AND SYSTEM CONTROLLED THEREBY
Filed April 26, 1962  2 Sheets-Sheet 1

INVENTOR.
ROY W. HOUSER
BY Robert R. Candor
ATTORNEY

Dec. 7, 1965  R. W. HOUSER  3,221,991
PNEUMATIC THERMOSTAT AND SYSTEM CONTROLLED THEREBY
Filed April 26, 1962  2 Sheets-Sheet 2

INVENTOR.
ROY W. HOUSER
BY
Robert R. Candor
ATTORNEY

United States Patent Office 3,221,991
Patented Dec. 7, 1965

1

3,221,991
PNEUMATIC THERMOSTAT AND SYSTEM
CONTROLLED THEREBY
Roy W. Houser, Orange, Calif., assignor to Robertshaw
Controls Company, Richmond, Va., a corporation of
Delaware
Filed Apr. 26, 1962, Ser. No. 190,487
21 Claims. (Cl. 236—87)

This invention relates to a pneumatic thermostat and system controlled thereby.

A feature of this invention includes a modulating thermostat and system controlled thereby which operates under vacuum pressures and which can control heating and/or cooling members which operate either by modulated action or by quick start and stop action, as desired.

Another feature of this invention includes a tube connectable to a vacuum source with a vacuum cavity surrounding an end of said tube, with a flexible diaphragm across said cavity which covers and uncovers the end of said tube by the flexing of said diaphragm to control the vacuum in said cavity, said cavity being connectable with a slave member responsive to the vacuum in said cavity to control the operation of a device.

Another feature of this invention includes a thermostat having a wall construction made of material having a certain coefficient of thermal expansion, a bowed resilient member made of a material having a different coefficient of expansion and having a rim construction secured to said wall construction, a vacuum cavity being formed in said wall construction with a vacuum in said cavity being controlled by the sidewise flexure of the central part of said resilient member.

Another feature of this invention includes a generally cylindrical wall with a generally disc-shaped wall attached to said cylindrical wall and having a vacuum cavity at the center of said disc-shaped wall, said walls having a certain coefficient of expansion and said cavity having a flexible diaphragm across said cavity with a vacuum suction tube with an end adjacent said diaphragm, a resilient member of a different coefficient of expansion and having its rim engaging said cylindrical wall and having its central part axially flexed toward and away from said diaphragm to move said diaphragm toward and away from said end of said tube to control the suction effect of said tube on said vacuum cavity.

Another feature of this invention includes a system and method in which a heat modifying device for an enclosure is controlled by a control member responsive to temperatures in said enclosure, said control member having one or more of the features herein disclosed.

Accordingly it is an object of this invention to provide a temperature responsive construction having one or more of the features herein disclosed.

Another object of this invention is to provide a system having one or more of the features herein disclosed.

Another object of this invention is to provide a method having one or more of the features herein described.

Other objects are apparent from this description, the appended claimed subject matter and/or the accompanying drawings in which:

2

Figure 5:
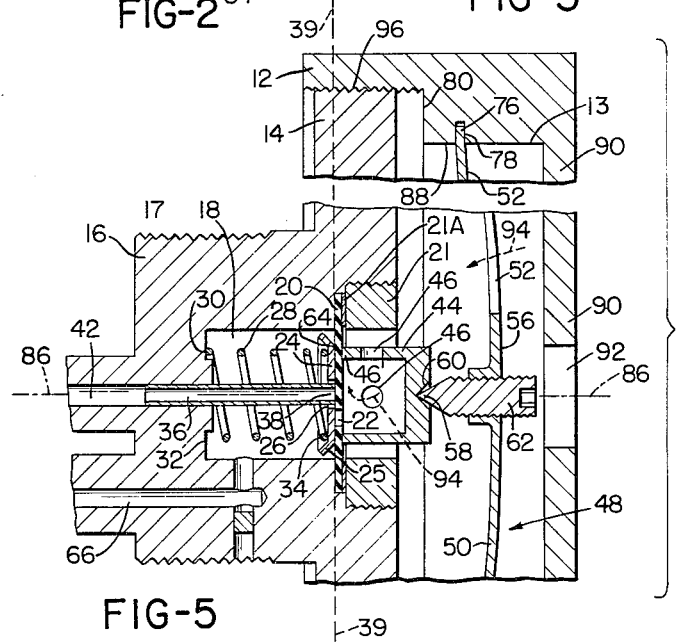
FIGURE 5 is an enlarged cross section of parts of the thermostat shown in FIGURE 1, wtih portions broken away.
Figure 6:
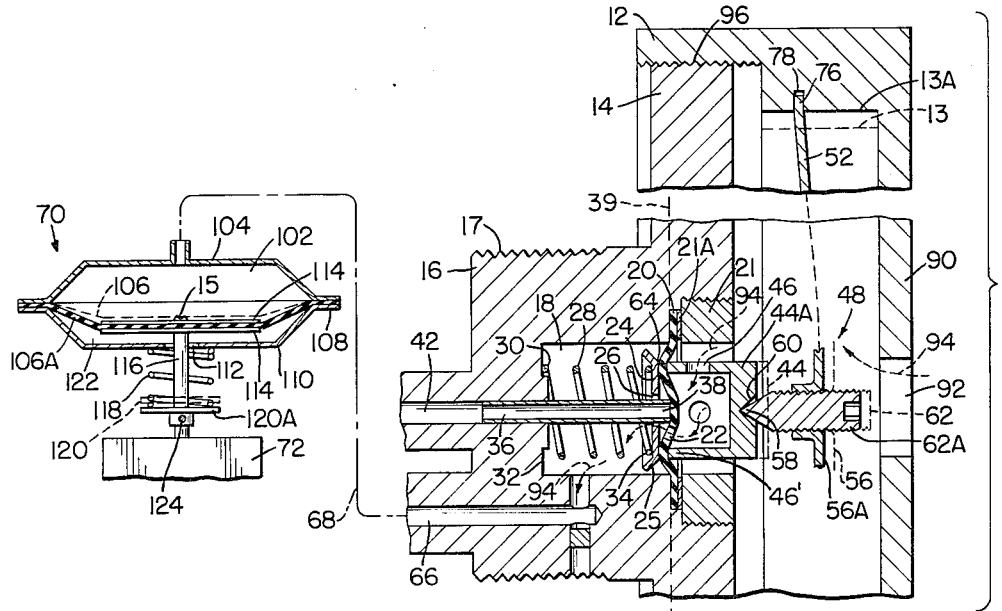

FIGURE 6 shows parts of FIGURE 5 when the temperature of the thermostat is raised above the selected temperature setting.

Figure 7:
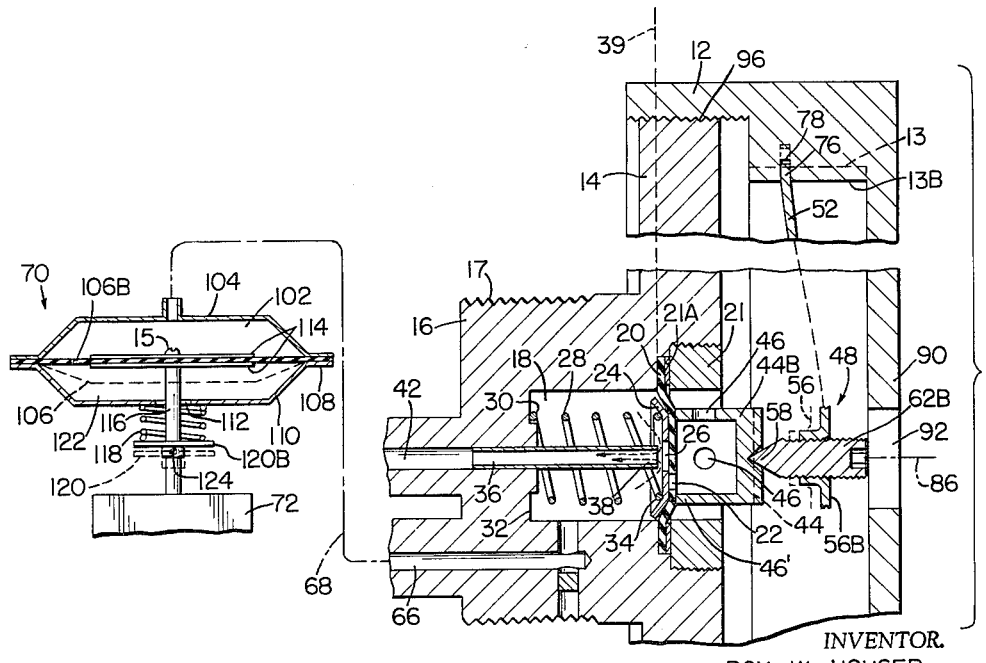

FIGURE 7 shows parts of FIGURE 5 when the temperature of the thermostat is below the selected temperature setting.

Figure 8:
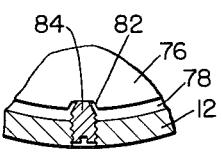

FIGURE 8 is a view including an adjusting screw used to bow the spider.

Certain words, indicating direction, relative position, etc., are used in this application for the sake of brevity and clearness of description. However, it is to be understood that these words apply only to the specific illustrations in the drawings, and that the actual articles or devices in use may have different directions and relative positions. Examples of such words are "vertical," "horizontal," "upper," etc.

A thermostat and a system according to this invention may include a thermostat 10 which may have a casing 11 which may be generally cylindrical or cylindraceous. The casing may have a cylindrical or cylindraceous side wall 12 with a transverse wall 14. The casing 11, or walls 12 and 14, may be made of material with a certain coefficient of thermal expansion, such as a material having a relatively high thermal coefficient of expansion. Such material may be an acetal resin, such as Delrin, or a polycarbonate, such as Lexan.

The transverse wall 14 may have means 16 forming a central axial cavity 18 in the transverse wall 14. The means 16 may be a hub, threaded at 17 for mounting on a wall or other support.

A flexible diaphragm 20 may extend across the cavity 18. The diaphragm 20 may be held in place by the threaded ring 21 and washer 21A. The diaphragm 20 may have an atmospheric air bleed hole 22 through the wall of the diaphragm. A cover plate 24 with a slanting rim 25, may be placed adjacent one side of the diaphragm 20 in a manner to cover the bleed hole 22 under certain conditions, and to uncover the hole 22 under other conditions. The cover plate 24 may have a tube receiving opening 26 which is offset from the bleed hole 22.

Spring means 28 may bias the plate 24 rightward toward the diaphragm 20. Such spring means may take the form of a compression helical coil spring having one end 30 bearing against the end wall 32 of the cavity 18, and having the other end 34 bearing against the plate 24. The effect of spring 28 is to bias the plate 24, and the diaphragm 20 rightward in FIGURES 5-7.

A suction tube 36 may be stationarily held in the means or hub 16 and may have a tube end 38 passing through the tube receiving opening 26. The tube end 38 may be covered and uncovered by the diaphragm 20. The tube end 38 may be in the plane indicated by the dotted line 39 in FIGURES 5-7, which is also the plane of the left side of the diaphragm 20 when in normal position in FIGURE 5. The tube 36 may be connected or connectable to a source of vacuum 40 by means of the tube or passageway 42. The tube 36 contacts and is covered and uncovered by the left side of the diaphragm 20.

A thrust cage or gap 44 may be pervious to atmospheric air, such as by the openings 46, and may have an orbital rim 46' thrust against, or secured to the diaphragm 20. The cage 44 may be on the other side of the diaphragm 20, and may be secured thereto.

A bowed, resilient thin wall member or spider 48 may be made of a material having a different coefficient of thermal expansion, such as a lower coefficient of thermal expansion than the coefficient of thermal expansion of the casing 10. For example, the material of such member 48 may be invar or stainless steel.

The member 48 may be an air pervious, thin wall member which may be made in the shape of a spider having a plurality of legs, such as legs 50, 51, and 52. The member 48 may have a rim structure 54 engaging the cylindraceous wall 12 in any suitable manner. The member 48 may also have a central part 56 producing an axial thrust at 58 on the cage 44. The cage 44 may have a recess 60 to receive the means or point 58 of an adjustable screw 62 which may be threaded on the central part 56 of the spider 48, to adjust the strength of the spring thrust produced by the spider 48 on the cage 44.

The rim 46' of the cage 44 may be located radially beyond the end 38 of the tube 36 and also radially beyond the bleed hole 22 and may be axially aligned with the outer edge or rim 64 of the flat part of the plate 24.

Means may be provided forming a suction passageway 66, connected by tubing or the like 68 to a slave or vacuum motor member 70.

The slave member 70 may actuate any device 72. For example, the device 72 may be a temperature modifier which heats or cools an enclosure such as a room, space, or enclosure 74.

For example the device 72 may be a furnace or other type of heater which heats the room, space, or enclosure 74 in which the thermostat 10 may be located, or a room or space to the temperature of which such thermostat is responsive. The construction may be such that the thermostat 10 controls the operation of the slave member 70, to cause the furnace or heater 72 to heat the heated room or space 74 to maintain the temperature of such room or space 74 within predetermined limits.

Alternatively or additionally, the device 72 may be a cooler, cooling means, or cooling air conditioner which cools the temperature of the space, room or enclosure 74, under the control of the thermostat 10, so the conditioner 72 tends to maintain such room or space 74 within predetermined temperature limits.

The slave member 70 may control or actuate any other device 72 desired, such as a hot or cold air damper and the like.

The member or spider 48 may be secured to the casing 12 in any desired manner. For example, the end 76 of each of the spider legs 50, 51, and 52 may be received in a respective groove 78 formed on a respective boss 80 on the interior of the cylindraceous wall 12. Any one of the ends of the legs 50, 51 or 52 may be provided with a notch 82, FIGURE 8, into which a screw 84 may be inserted adjustably to apply a predetermined amount of compressive force on the spider causing it to be bowed as shown in FIGURES 1 and 5.

The spider 48 may be attached to or be inserted in the casing or wall 12 in any desired manner. For example, the spider 48 may have its normal shape lying in a single plane, or may be somewhat prebowed before insertion into the wall 12. The ends 76 of the spider legs may be inserted into the grooves 78 by rotating the legs about the central axis 86, and inserting each respective end 76 edgewise into the respective groove 78. Alternatively, two of the legs, such as 51 and 52, may have their ends 76 preliminarily inserted into the respective grooves 78, and then the end 76 of the leg 50 may be snapped or otherwise forced over the rim 88 of the adjacent boss 80.

Thereafter, a screw 84 may be inserted into a notch 82 on any one of the legs adjustably to apply a proper compressive force on the spider, as desired.

Figure 1:
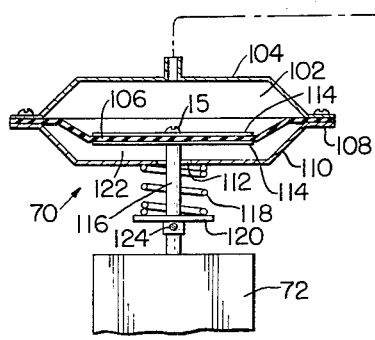
FIGURE 1 is a diagrammatic representation of a pneumatic system embodying this invention.
Figure 2:
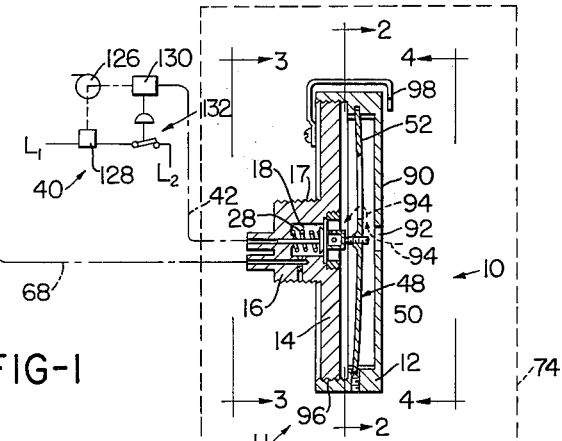
FIGURE 2 is a cross section along line 2—2 of FIGURE 1.
Figure 2:
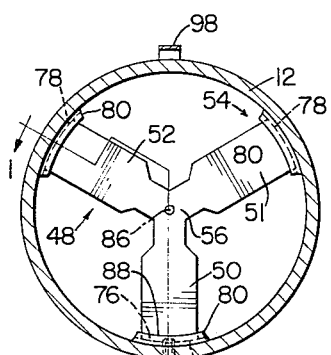
Figure 3:
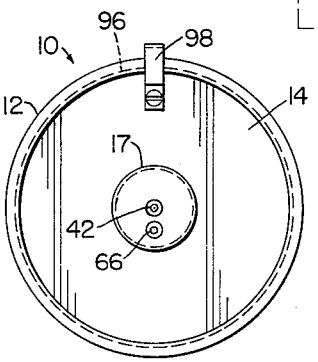
FIGURE 3 is a cross section along the line 3—3 of FIGURE 1.
Figure 4:
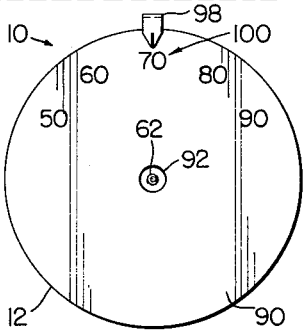
FIGURE 4 is an end elevation along line 4—4 of FIGURE 1.

The thermostat 10 may also include a protective wall 90 which may be provided with an opening 92 for the admission of atmospheric air 94 which may find its way between the legs 50, 51, and 52 and may enter the cage 44 through the openings 46, as indicated in FIGURES 1, 5, and 6.

The transverse wall 14 may be threadedly connected at 96 to the wall 12, so the cylindraceous wall 12 may be longitudinally adjusted by turning the wall 12 relatively the wall 14, to cause the threaded construction 96 to produce an axial or longitudinal movement.

The wall 14, for example, may be provided with a pointer 98 which may indicate the temperature markings 100 to which the thermostat construction may be set. A temperature setting by the day to day user may be made by rotation of the wall 12. Calibration by a service man may be made by adjustment of the screw 62 by a screw driver inserted through the opening 92, to cause the indicia 100 to indicate the correct temperatures or other settings, as desired. The screw 84 may also be turned to adjust its force, as desired.

The slave member 70 may have an expansible and contractable space 102 which may be encased by the upper wall 104 of the slave casing and by a diaphragm 106. The diaphragm 106 may have its outer edge secured at 108 between the upper casing wall 104, and the lower casing wall 110. The casing wall 110 may have on opening 112 for the admission or discharge of atmospheric air into or from the space 122 below the diaphragm 106.

The diaphragm 106 may be provided with force distributing and transmitting plates 114, which may be secured by a screw 15 to a shaft 116 which is longitudinally movable in response to vacuum pressures maintained in the space 102. Such vacuum pressures are produced by the connection or tubing 68 in response to vacuum pressures maintained in the cavity 18 in a manner elsewhere described. The vacuum pressures in space 102 and cavity 18 may be substantially equal.

The length of longitudinal movement of the shaft 116 may be entirely different from the longitudinal length movement of the plate 24. The length of longitudinal movement of the shaft 116, in response to any given pressure change, is dependent upon the area of the disphragm 106 and of the downward spring rate and push of the spring 118 on the plate 120 which is attached to the shaft 116. The downward push of the spring 118 opposes the upward push of the atmospheric pressure in the space 122 against the vacuum pressure in the space 102. The plate 120 is adjustable by a screw 124, to vary the thrust of the spring 118, and thereby vary the length of longitudinal movement of the shaft 116 in response to any given change in vacuum pressure in the space 102. Adjustment of plate 120 may also calibrate the setting or control produced on the device 72.

The source of vacuum 40 may be simply a single vacuum pump 126, which may be operated by any suitable means, such as a motor 128, which is energized by the power line $L_1$, $L_2$ in any desired manner. The vacuum pressure may be variable. The pump 126 may be connected directly to the passageway 42, or a vacuum tank 130 may be interposed between the pump 126 and the cavity 18, to act as an accumulator of vacuum producing capacity for the pump 126 during idle periods of the thermostat 10. Also if desired, a pressure responsive switch 132 may be provided to cause operation of the motor 128 and vacuum pump 126 in a manner to maintain the vacuum pressure in tank 130 within predetermined limits dependent on the responsiveness of the switch 132. The vacuum produced by the pump 126 with or without the accumulator 130 is made greater than any vacuum required in the cavity 18.

The thermostat 10 may be used to control any temperature modifying device or system. It may control a heater or cooler for the space 74. The thermostat 10 is made responsive to the temperature of the space 74 and modifies the action of the heater or cooler in a manner tending to maintain the space 74 at the temperature selected by the setting of the pointer 98.

In general, the thermostat 10 tends gradually to increase the vaccum applied to slave member 70 when the thermostat is undercooled by the temperature of space 74, as in FIGURE 7. The thermostat 10 also tends gradually to decrease the vacuum applied to the slave member 70 when the thermostat is overheated by the temperature of the space 74, as in FIGURE 6. Therefore the slave member 70 may be connected to control the operation of the heater or cooler, or of a hot or cold air damper in the proper manner to tend to restore the temperature of the space 74 to the selected temperature.

By way of example, the thermostat 10 and slave member 70 of FIGURE 1 are shown as controlling a temperature modifier 72 which may be any type of heating or cooling modifier, such as a heater, a cooler, a hot air damper, a cold air damper, or any other temperature modifier susceptible of control by a slave member, or the like.

For convenience in description, the system of FIGURE 1 will be hereafter specifically described as applied to a furnace or a hot air damper 72, or the like, which may have its heating action stopped or decreased by downward movement of shaft 116 and may have its heating action started or increased by upward movement of the shaft 116. Also, as is readily understood, the shaft 116 may be connected to a cooler, or a cold air damper or the like which may have its cooling action started or increased by downward movement of shaft 116 and may have its cooling action stopped or decreased by upward movement of shaft 116.

The slave member 70 may be connected to temperature modifiers which have gradually modulated positions, such as hot or cold air dampers and the like. Under these conditions the thermostat 10 modulates the positions of such dampers by a substantially gradual change in the vacuum produced in the thermostat cavity 18 and slave space 120, so the controlled damper may be gradually varied to produce a modulated control on the temperature of space 74.

The slave member 70 may also be connected to temperature modifiers which have quick start and stop positions, such as furnaces which have full on and off electrically controlled fuel burners and motor driven fans. Also the slave member may be connected to quick start and stop air cooling conditioners which have full on and off motors and switches to drive the refrigerating system and the blowers. Under these conditions the slave member shaft 116 may be gradually raised and lowered by the modulated action of the thermostat 10 and slave member 70. However, the controlled quick start and stop furnace or cooling air conditioner may have built in ON and OFF control switches which respond to selected up and down positions of the control shaft 116.

For example, if the modifier 72 is a quick start and stop gas or oil furnace, such furnace is quick started by snap action of its built in switches when the shaft 116 is raised and reaches the position corresponding to diaphragm 106B and plate 120A shown in FIGURE 7. The furnace will then remain in full ON condition even if the slave shaft 116 is gradually lowered to and past the diaphragm position 106 of FIGURE 1. The furnace continues in full ON condition while the shaft 116 is gradually lowered to diaphragm position 106A and plate position 120A of FIGURE 6. At this position the furnace switches respond with a snap action and the furnace changes to a full OFF condition. The furnace will then remain in full OFF position as the space 74 gradually cools and gradually moves the various parts, including shaft 116 back to the diaphragm position 106B and plate position 120B of FIGURE 7.

A converse quick start and stop operation may be produced in a quick start and stop motor and switch operated cooling air conditioner, as is obvious.

However, it is to be understood that the control system of this invention may also be used to control any gradually modulating heater or cooler to provide a gradually modulating heating or cooling action which can be responsive to the gradual movements of the slave shaft 116. Such gradually modulating heaters or coolers may be hot air or cold air dampers or they may be gradually modulatable furnaces or cooling air conditioners, as desired.

The following description of the operation of the thermostat 10 and slave member 70 discloses how a gradual heating of the thermostat 10 causes a gradual decrease in vacuum effect (but a gradual increase in subatmospheric air pressure) in the thermostat cavity 18 and slave cavity 102. The description also discloses how a gradual cooling of the thermostat 10 causes a gradual increase of vacuum effect (and a gradual decrease in subatmospheric air pressure) in the cavities 18 and 102.

FIGURES 1 and 5 show the thermostat 10 and slave member 70 in positions corresponding to the temperature selected by the positioning of pointer 98 at "70", for example.

If the thermostat walls 12, 14 sense an increase in temperature, such walls will expand from position 13 of FIGURE 5 to position 13A of FIGURE 6, for example. This will permit the spider 48 to move toward a planar shape, as at 56A in FIGURE 6, thereby increasing the bias of the spring spider 48 on the cage 44 to move it to position 44A. Spider center 56 also is moved to 56A and screw 62 to 62A. This leftward movement of the cage 44 forces the portion of the diaphragm 20 engaged thereby leftward and moves cup 24 leftward against the bias of the spring 28.

Such movement of the cup 24 moves the same out of engagement with the diaphragm 20 in the area of port or opening 22, permitting atmospheric air to enter the cavity 18 through ports 92, 46 and 22. This also permits air to enter the slave cavity 102 through the connections 66 and 68. The air so admitted decreases the vacuum effect in the cavities 18 and 102 and increases the subatmospheric air pressure therein.

When air was admitted into cavity 18 through the opening 22, the subatmospheric air pressure in cavity 18 was increased to move the diaphragm 20 rightward against the bias of spider spring 48 to restore the diaphragm 20, cup 24 and cage 44 to the equilibrium positions shown in FIGURE 5, with no further air flowing into the cavity 18 and with the system in equilibrium. However, the vacuum effect in the cavities 18 and 102 was decreased so the position of the diaphragm 106, shaft 116 and plate 120 would then be at a lower position such as at 106A and 120A of FIGURE 6, for example.

Further gradual heating of the thermostat 10 would produce further gradual decrease in vacuum effect in cavities 18 and 102 with a further gradual downward movement of diaphragm 106, shaft 116 and plate 120. The degree of vacuum produced would be proportional to the leftward bias of the spring spider 48 in response to thermal expanse of the thermostat walls 12, 14.

Therefore a gradual heating effect on the thermostat 10 produces a corresponding gradual decrease in vacuum effect in cavities 18 and 102 and a corresponding gradual downward movement of shaft 116. This gradual shaft movement may be used to produce a modulated decrease or quick stop in heating effect of a heater or hot air damper and the like, as elsewhere explained. It also may be used to produce a modulated increase or quick start of cooling effect of a cooling air conditioner, or cold air damper, or the like, as elsewhere explained.

Such modulated decrease or quick stop in heating effect or modulated increase or quick start of cooling effect would tend to cool the air space 74, as well as the thermostat walls 12 and 14, which then would produce a counteracting effect on the heating or cooling means as follows.

Cooling of the thermostat walls 12 and 14 will cause them to contract, for example, as indicated in FIGURE 7 to the position 13B, for example, thereby bowing the spider 48 to decrease the bias of the same on the cage 44, and permit the spring 28 to move the diaphragm 20 and cage 48 rightwardly away from the end 38 of tube 36, with the cage 44 in position 44B, spider center in position 56B and screw 62 in position 62A.

Such movement of diaphragm 20 establishes communication between the source of vacuum 40 and the cavity 18 thereby drawing and increasing the vacuum on the thermostat cavity 18 and the slave cavity 102. Such increase in the vacuum in cavity 18 will cause the diaphragm 10 to be drawn leftwardly against the bias of spring 28 once again to seal the end 38 of tube 36, as shown in FIGURE 5, so the system once again is in equilibrium with no air flowing.

However, it is to be noted that the degree of increased vacuum in the cavities 18 and 102 at this stage of operation is proportional to the bias of spring spider 48 under the stress of the contracted walls 12 and 14 to the position 13B of FIGURE 7.

This increased vacuum which has been produced by the cooling of thermostat walls 12 and 14 causes the slave diaphragm 106, shaft 116 and plate 120 to be moved upward, for example, to positions 106B and 120B of FIGURE 7.

The movement of the parts between the positions of FIGURES 5, 6 and 7 is continuous and gradual and modulated in response to temperature changes in the thermostat 10. Since the vacuum pressures in cavity 18, passages 66 and 68, and slave cavity 102 are gradual and proportional to the bias of the spring spider 48, the apparatus disclosed acts as a modulating regulator which can be used to control a modulated, or a quick start and stop, heating and/or cooling, heat exchanger, as elsewhere explained.

The action is independent of fluctuations in the vacuum pressure of the vacuum supply 40 as long as the vacuum in such supply 40 is equal to or greater (lower in subatmospheric air pressure) than any vacuum required in the thermostat or slave member.

Since the surface of the thermostat 10 is exposed to the surrounding ambient being controlled, the thermostat is more sensitive and thus more responsive to radiant as well as convective heat energies.

While the form of the invention now preferred has been disclosed as required by the statues, other forms may be used, all coming within the scope of the claims which follow.

What is claimed is:

1. In combination: a casing formed by a cylindraceous wall and a transverse wall and being made of material with a first coefficient of thermal expansion, said transverse wall having a central axial cavity; a flexible diaphragm across said cavity and having an atmospheric bleed hole; a cover plate adjacent the cavity side of said diaphragm and covering said bleed hole and having a tube receiving opening offset from said bleed hole; spring means biasing said plate toward said diaphragm; a suction tube connectable to a source of vacuum on said cavity side of said diaphragm and having a tube end passing through said tube receiving opening, said tube end being covered and uncovered by said diaphragm, a thrust cage pervious to the atmosphere and having a rim thrust against the other side of said diaphragm radially beyond the end of said tube and said bleed hole; a bowed resilient member made of material with a second coefficient of thermal expansion and having a rim structure engaging said cylindraceous wall and having a central part producing an axial thrust on said cage; and means forming a suction passageway from said cavity and connectable to a slave member.

2. A combination according to claim 1 in which said cylindraceous wall is longitudinally adjustable relatively to said transverse wall.

3. A combination according to claim 1 in which said cylindraceous wall is threadedly longitudinally adjustable relatively to said transverse wall.

4. A combination according to claim 1 in which said central part of said resilient member has means for adjusting the axial thrust on said cage.

5. A combination according to claim 1 in which a threaded member provides means for adjusting the axial thrust on said cage.

6. A combination according to claim 1 in which said tube is stationary.

7. A combination according to claim 1 in which said resilient member is in the form of a spider.

8. A combination according to claim 1 in which said first coefficient of thermal expansion is greater than said second coefficient of thermal expansion.

9. A combination according to claim 1 having a source of vacuum, and in which said suction tube is connected to said source of vacuum.

10. A combination according to claim 1 having a slave member, and in which said suction passageway is connected to said slave member.

11. A combination according to claim 10 having a temperature modifying unit, and in which said slave member controls a temperature modifying unit.

12. In combination: a stationary tube connectable to a source of vacuum; a vacuum chamber surrounding an end of said tube and being connectable to a slave member; a flexible diaphragm across said vacuum chamber and having one diaphragm side covering and uncovering said end of said tube by the flexing of said diaphragm; an atmospheric bleed hole in said diaphragm offset from the end of said tube; a cover plate having an opening surrounding the end of said tube, said plate covering and uncovering said bleed hole; biasing means yieldingly biasing said cover plate toward said diaphragm; and thrust means on the opposite diaphragm side movable to open the end of said tube while closing said bleed hole and closing the end of said tube while opening said bleed hole.

13. A combination according to claim 12 having thermostatic means and in which said thrust means is moved by said thermostatic means.

14. A combination according to claim 12 having a thermostat having a casing having a first coefficient of thermal expansion and having a resilient member having a second coefficient of expansion and in which said thrust means is moved by said thermostat.

15. In combination: a tube connectable to a vacuum source; a vacuum chamber surrounding an end of said tube, said chamber being connectable with a slave member; a flexible diaphragm across said vacuum chamber and having one diagram side directly covering and uncovering said end of said tube by the flexing of said diaphragm; a thrust cage having a movable rim engaging the other side of said diaphragm; and means operated by movement of said rim in one direction to cause said end of said tube to be uncovered by said one side of said diaphragm, and operated by movement of said rim in the other direction to cause said end of said tube to be covered by said one side of said diaphragm and to cause atmospheric air to be introduced into said vacuum chamber.

16. A combination according to claim 15 having thermostatic means, and in which said thermostatic means causes movement of said cage.

17. A combination according to claim 15 having thermostatic means, and in which said thermostatic means causes movement of said cage, said thermostatic means comprising a resilient member having an edge construction and a central part and having one coefficient of thermal expansion and a resilient member supporting member having another coefficient of thermal expansion.

18. A combination according to claim 17 in which said resilient member supporting member supports said edge construction of said resilient member and said central part of said resilient member moves said rim.

19. A combination according to claim 18 having a vacuum source and a slave member, and in which said vacuum source is connected to said tube and said slave member is connected with said vacuum chamber.

20. In combination: a wall construction made of material having a first coefficient of thermal expansion; a resilient member made of a material having a different second coefficient of thermal expansion, said resilient member having a rim secured to said wall construction and having a central part bowed laterally by the shapes and the difference in the coefficients of thermal expansion of said wall construction and said resilient member; means carried by said wall construction forming a vacuum cavity; a flexible diaphragm across said cavity; a tube connectable to a source of vacuum extending into said cavity with an end of said tube adjacent said diaphragm and being covered and uncovered directly by a side of said diaphragm, and by the flexing of said diaphragm by change in temperature of said wall construction and resilient member; and means operated by the bowing of said central part of said resilient member controlling the covering and uncovering of said end of said tube.

21. In combination: a generally cylindrical wall; a generally disc-shaped wall attached to said cylindrical wall and having a vacuum cavity at the center of said disc-shaped wall, said walls having a first coefficient of thermal expansion; a flexible diaphragm across said cavity; a vacuum suction tube with an end covered and uncovered directly by one side of said diaphragm; a resilient member having a different second coefficient of thermal expansion and having a rim engaging said cylindrical wall and having a central part axially flexed toward and away from said diaphragm; and means moved by said central part causing said one side of said diaphragm to move into and out of contact with said end of said tube to control the suction effect of said tube on said vacuum cavity.

References Cited by the Examiner

UNITED STATES PATENTS

| | | | |
|---|---|---|---|
| 618,260 | 1/1899 | White | 73—363.3 |
| 1,405,181 | 1/1922 | Bristol | 236—46 |
| 1,743,142 | 1/1930 | James et al. | 73—363 |
| 2,197,276 | 4/1940 | Maloany | 236—101 |
| 2,370,582 | 2/1945 | Rodway. | |
| 2,868,459 | 1/1959 | Modes | 236—87 |
| 3,125,111 | 3/1964 | Daly. | |

FOREIGN PATENTS

| | | |
|---|---|---|
| 23,139 | 11/1901 | Great Britain. |
| 268,812 | 8/1928 | Great Britain. |
| 507,266 | 9/1920 | France. |

EDWARD J. MICHAEL, *Primary Examiner.*

PERCY L. PATRICK, ALDEN D. STEWART,
*Examiners.*